Richardson, White & Weed.
Corn Harvester.
N° 24434 — Patented Jun. 14, 1859.

UNITED STATES PATENT OFFICE.

G. W. RICHARDSON AND JAS. W. WHITE, OF GRAYVILLE, ASSIGNORS TO THEMSELVES AND GEO. M. WEED, OF WHITE COUNTY, ILLINOIS.

IMPROVEMENT IN CORN-HARVESTERS.

Specification forming part of Letters Patent No. 24,434, dated June 14, 1859.

*To all whom it may concern:*

Be it known that we, GEO. W. RICHARDSON and JAMES W. WHITE, of Grayville, in the county of White and State of Illinois, have invented new and useful Improvements in Machines for Gathering Corn, the construction and operation of which we have described in the following specification and illustrated in the accompanying drawings with sufficient clearness to enable competent and skillful workmen in the arts to which it pertains or is most nearly allied to make and use our invention.

Our invention consists in the combination of screw-threaded terete rollers, flaring plates or guides, vertical flanges, and gathering-wheels, arranged and operated as hereinafter more fully set forth.

Figure 1:
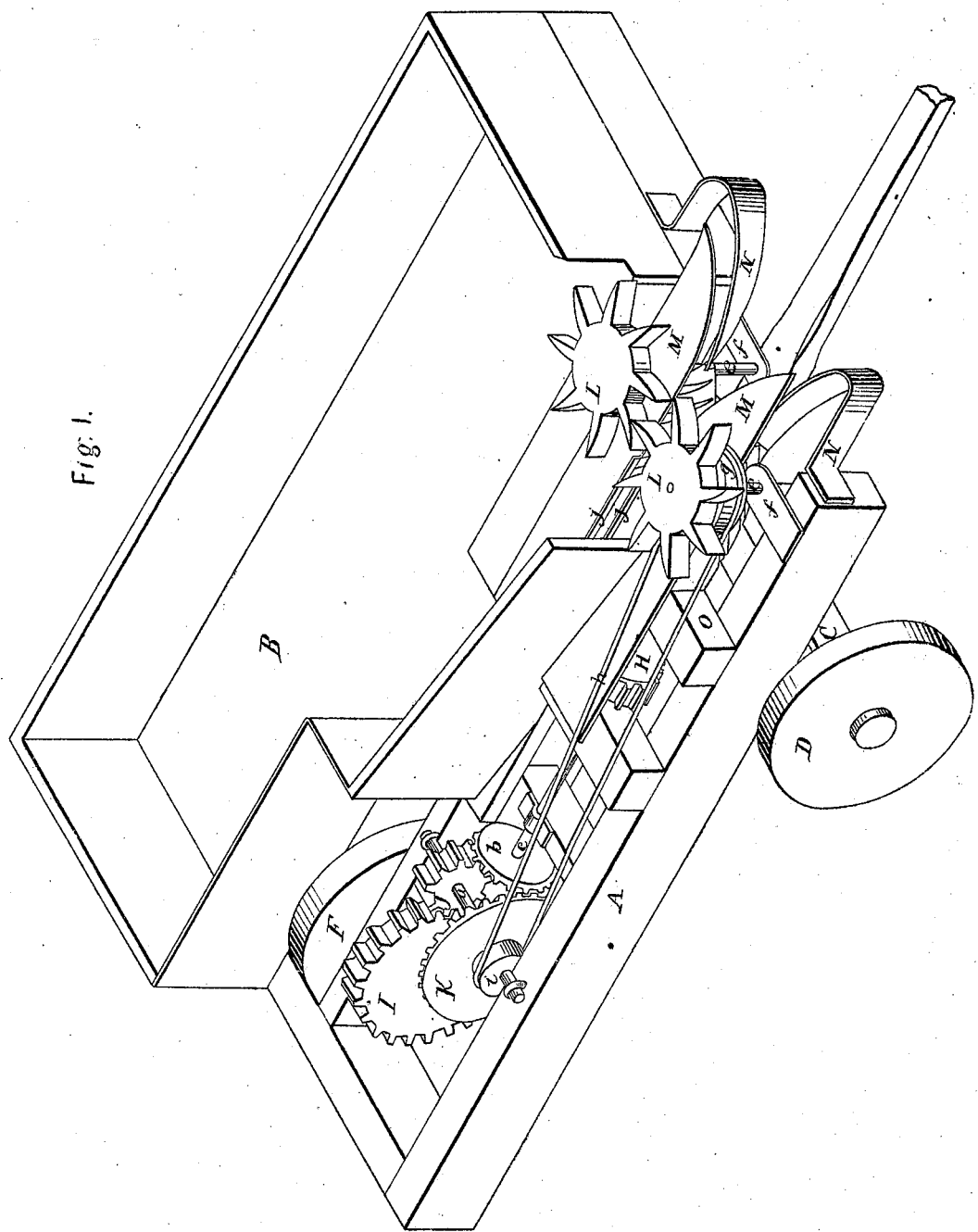
Figure 2:
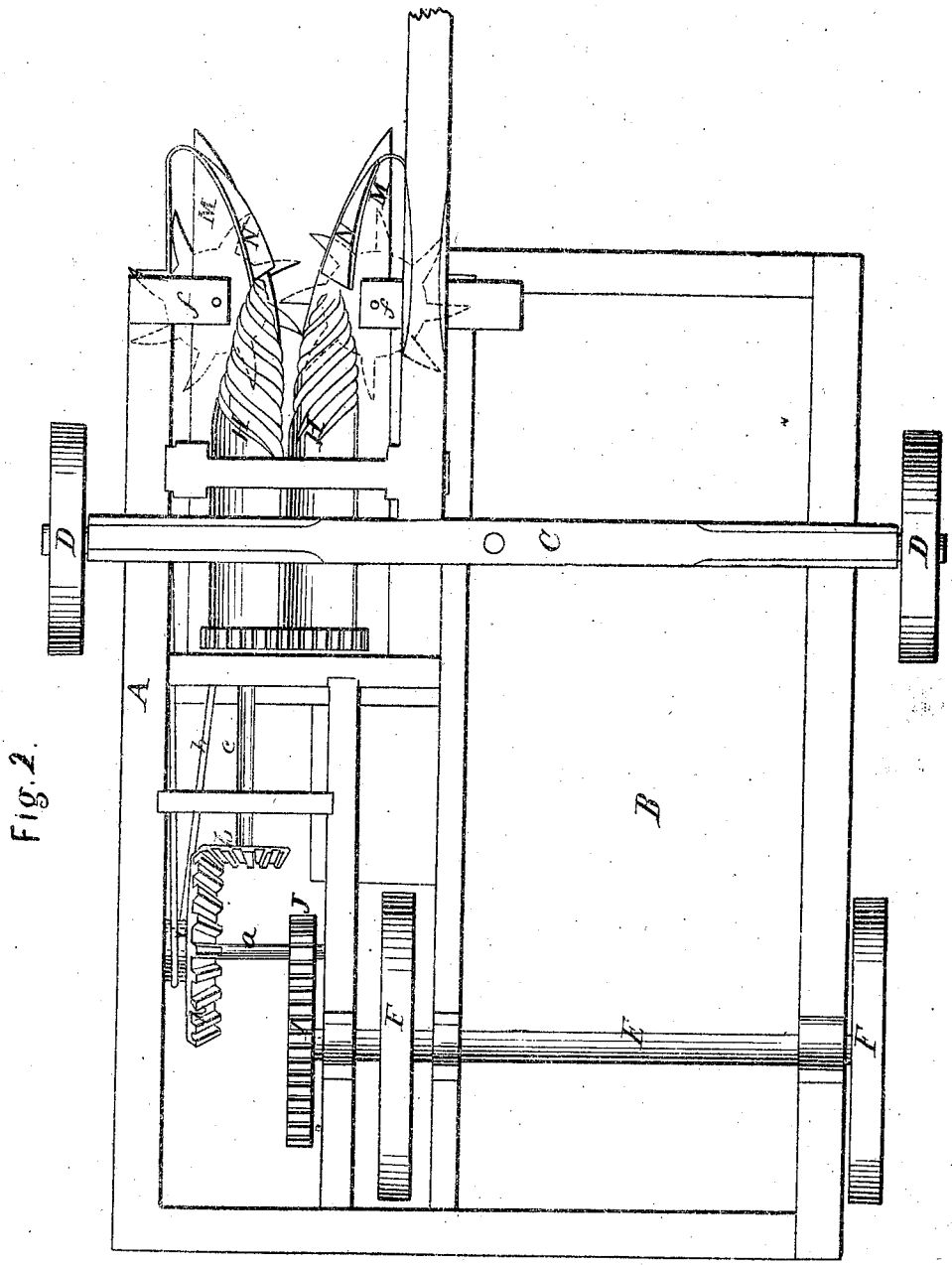

In the accompanying drawings, Figure 1 is a perspective view of our improved machine. Fig. 2 is an under side view.

A is the frame, upon which is attached a wagon-body, B, for the reception of the grain in the husk. The forward end of the machine is supported upon an axle, C, resting upon wheels D D. Near the back part and underneath the frame are journal-boxes, in which the shaft E is hung.

F F are traction-wheels secured upon shaft E, which rotate as the machine is drawn along the ground, and by means of an arrangement of gearing motion is given to the terete rollers H H.

I is a wheel secured on the end of shaft E, gearing into pinion J on shaft *a*.

K is a bevel-gear, also attached on shaft *a*, and working into pinion *b* on shaft *c*, running at right angles to shaft *a*, upon which one of the terete rollers is secured.

*d d* are gears secured on the back end of the terete rollers, one imparting motion to the other.

L L are gathering-wheels secured upon the upper end of vertical shafts *e e*, running in bearings *f f f f*. The form of these wheels is such that they act upon each other as loose gearing, and one imparts motion to the other. On the under side of one of the gathering-wheels L, and secured upon the shaft *e*, is a groove-pulley, *g*, to receive band *h*, by which motion is imparted to one of the gathering-wheels from groove-pulley *i* on shaft *a*.

M M are flaring plates, placed centrally over the terete rollers and underneath the gathering-wheels, and made flaring for the purpose of guiding the stalks in between the vertical flanges *j j* on plates M M. These flanges are for the purpose of breaking off the ears of corn as the stalk is drawn through the rollers. The terete rollers are supported about midway by boxes attached to the beam O, resting upon the frame A. The terete rollers, being made screw-threaded, cause the stalks to be drawn in between the vertical flanges *j j* and through the rollers at the same time, the threads on the rollers preventing the possibility of the stalks slipping. One of the terete rollers and one of the gathering-wheels are adjustable, the one that receives motion from the other of each; also, one of the flaring plates is adjustable.

As the machine is drawn forward on the ground motion is imparted to the terete rollers from the traction-wheels by means of gearing. The gathering-wheels receive motion from a cord passing over groove-pulleys *g* and *i* on shafts *e* and *a*. As the machine passes along the ground the flaring plates direct the stalks between the gathering-wheels, which take them and pass them along between the vertical flanges, and the terete rollers, running at a high speed, draw the stalks down between the vertical flanges, and the ears, striking on the tops of said flanges, are broken off and left in the wagon.

It is obvious that the rollers H might be made sufficiently large to gather most of the corn in the row without the guides or gathering-plates N; but this would involve the necessity of their being so large as to bring them too far from the plates which break off the ears, and this would interfere seriously with the utility of the machine. It is true that the plates M are so formed as to have a tendency to gather in the stalks so as to bring them within the action of the rollers; but their necessary construction and position is such as would frequently allow crooked or lodged stalks to pass outside of the rollers H and between them and the gathering-plates into various positions, which would interfere seriously with the operation of the machine, and as the outer surfaces of these rollers rise as the machine is propelled, this difficulty is increased so as to be a very serious one. The plates N, meeting these rollers at the forward end or point, and being placed in line with their centers, obviate this difficulty and give a sure and certain action in this respect. Gathering-rollers and flaring plates, without these guides, have been used; but they do not appear to have been very successful.

In order to the successful operation of the machine, it is further necessary that gathering-wheels L should be placed above the plates M, the rollers H alone being insufficient to secure that certainty of action which is necessary in bringing the stalks between the plates, as otherwise many of the stalks which have ears upon them would be bent away, so as not to come at all within the narrow place where the ears are broken off. For a similar reason we give the threads or flutings upon the terete rollers such a direction as that while the stalks are drawn downward they are at the same time drawn backward, else they might by the action of the other parts be pulled up by the roots and thrown into such a position as to interfere seriously with the operation of the machine; and it is not admissible to put gathering-wheels below like those above, as there is not room for them without removing the terete rollers, which are important to the success of the machine.

Having thus fully described our invention, and stated the bearing and operation of the different parts, we wish it distinctly understood that we do not claim broadly either terete rollers or flaring plates, or their combination in a machine for stripping corn from the stalk.

The particular improvement which we claim as having been originally and first invented by us is—

The combination of the gathering-wheels L L, terete rollers H H, stripping-plates M, and guide-plates N, the whole being constructed and arranged substantially as and for the purpose set forth.

G. W. RICHARDSON.
JAS. W. WHITE.

Witnesses:
ALONZO MILLS,
M. M. ALLEN.